United States Patent [19]

Luthe et al.

[11] 4,108,210
[45] Aug. 22, 1978

[54] CONTROL VALVE TRIM ASSEMBLY

[75] Inventors: Fred J. Luthe; Allen E. Hays, both of Marshalltown, Iowa

[73] Assignee: Fisher Controls Company, Marshalltown, Iowa

[21] Appl. No.: 719,754

[22] Filed: Sep. 2, 1976

Related U.S. Application Data

[63] Continuation of Ser. No. 404,820, Oct. 9, 1973, abandoned.

[51] Int. Cl.$^2$ ............................................. F16K 47/08
[52] U.S. Cl. ......................................... 138/42; 138/40; 137/625.28; 137/625.3; 137/625.37; 251/127
[58] Field of Search ...................... 138/39, 40, 42, 43, 138/46; 137/625.28, 625.3, 625.37; 251/125, 127; 181/47 R, 47 B, 48

[56]  References Cited

U.S. PATENT DOCUMENTS

| 1,818,258 | 8/1931 | Isaacks | 138/42 |
| 1,852,164 | 4/1932 | Holzwarth | 138/46 X |
| 2,132,854 | 10/1938 | Knott | 138/42 |
| 2,748,802 | 6/1956 | Hanson et al. | 138/42 |
| 2,856,962 | 10/1958 | Christoph | 138/42 |
| 3,253,401 | 5/1966 | Wells | 138/42 X |
| 3,439,659 | 4/1969 | Bouwkamp | 138/42 X |
| 3,514,074 | 5/1970 | Self | 138/42 X |
| 3,722,854 | 3/1973 | Parola | 138/42 X |
| 3,744,762 | 7/1973 | Schlicht | 138/42 X |
| 3,917,221 | 11/1975 | Kubota et al. | 138/42 X |

Primary Examiner—Richard E. Aegerter
Assistant Examiner—James E. Bryant, III
Attorney, Agent, or Firm—Lawrence L. Limpus; James C. Bolding

[57]  ABSTRACT

Described herein are fluid flow control valve trims suitable for use in a valve in which high fluid pressure drops are to be sustained without excessive noise generation or cavitation damage to valve members. The valve trim is constructed of two or more annular cages surrounding a central passageway, each outer cage circumferentially engaging the next inner cage. A valve stem carrying a valve plug member is axially movable within the central passageway, the plug member slidingly engaging the radially inward surface of the innermost annular cage. Communicating through the walls of each of the cages are flow-restricting orifices and fluid pressure recovery chambers defining two or more sequential orificial throttling stages. By the use of concentric annular cages a valve trim structure is achieved in which the flow-restricting orifices and pressure recovery chambers may readily be formed having reproducible, predetermined sizes and shapes by conventional machining operations.

6 Claims, 5 Drawing Figures

CONTROL VALVE TRIM ASSEMBLY

This is a continuation of application Ser. No. 404,820 filed Oct. 9, 1973, now abandoned.

FIELD OF THE INVENTION

This invention relates generally to fluid flow control valves of the type which are continuously adjustable from a closed to an open position to provide a quantity of fluid flow which is a function of valve position. More particularly, this invention relates to flow control valve trims for use in a fluid system in which high pressure drops must be achieved across a valve without concomitant cavitation, noise generation and physical damage to valve parts.

BACKGROUND OF THE INVENTION

In fluid flow control systems it is frequently required to reduce fluid pressures by several hundreds of pounds per square inch in order to maintain flow control. Pressure drops of this magnitude are commonly accompanied by cavitation and generation of audible noise. Generally, cavitation will occur in a liquid system when the pressure is reduced below the vapor pressure of the liquid, at which time vapor bubbles form in the liquid. When, as in the case of a control valve, throttling is followed by pressure recovery, these vapor bubbles collapse or implode, generating shock waves in the liquid. These shock waves commonly result in severe erosion, or "cavitation damage," to valve parts when conventional plug and orifice valves are employed. Such damage, of course, leads to premature valve failure, having serious economic consequence.

DESCRIPTION OF THE PRIOR ART

Heretofore it has been common to treat the problems of cavitation, noise generation and metal erosion in fluid flow control valves in several ways. The first method of treatment, exemplified by the teachings of U.S. Pat. No. 3,637,188 to Ung, and U.S. Pat. No. 2,187,811 to Smith, has been to divide the throttling action of a control valve into a number of throttling stages of conventional plug and orifice design, each of the stages providing a fractional amount of the pressure drop required. This approach fundamentally consists of placing a number of conventional plug and orifice valves within a single valve body.

The second common treatment of the above described problems has been to incorporate a lengthy fluid flow path of tortuous or labyrinthine configuration within the internal elements of a valve. Typical of such valves are those taught by U.S. Pat. Nos. 3,715,098 and 2,485,474 to Baumann. Such valves are commonly characterized as producing "adiabatic flow with friction," or pressure reduction accompanied by constant fluid enthalpy, which renders these valves less susceptible to cavitation damage and results in quieter valve operation. Manufacture of such valves having tortuous flow paths ordinarily requires costly, complex machining operations on the valve elements.

A third treatment of these problems has been to provide within a valve body a cage member having perforated or slotted walls and a valve plug member slidable therein. In a valve of this type, exemplified by Allowed U.S. application Ser. No. 157,906, filed June 29, 1971, by E. E. Allen, the flowing fluid is subdivided into many smaller streams or jets flowing through the holes in the valve cage member. While these valves, as well as the prior art valves mentioned above are capable of significant noise reduction, nevertheless a further reduction in noise generation is often desirable and frequently required.

A fourth treatment of these problems which has more recently been applied to use a valve cage trim made up of a stack of annular plates or discs and having a valve plug member slidable therein. Etched or machined on these plates is a set of grooves forming tortuous passageways, orifice and baffle arrangements, or the like. Manufacture of this type of valve trim is necessarily relatively expensive in comparison with the above described valves. Moreover, retention of the discs in proper alignment may present a problem, and in operation these valves may be more susceptible to plugging by particulate matter entrained in the flowing fluid than the valve types described above.

BRIEF SUMMARY OF THE INVENTION

The general purpose of this invention is to provide a fluid flow control valve trim which reduces cavitation and physical damage to valve parts in liquid-throttling service, and reduces generation of aerodynamic noise in gas-throttling service, while sustaining high pressure differentials, yet is of simple construction.

An object of the present invention is to provide a structural configuration which achieves fluid pressure reduction and flow control by subdivision of the flowing fluid into a multiplicity of fluid jets by a process of orificial throttling through a multiplicity of flow orifices.

Another object of this invention is to provide a structural configuration wherein a plurality of similar successive stages of flow throttling may be achieved within a compact valve body.

Yet another object of the present invention is to provide a structure which allows the fluid to expend energy upon itself rather than upon the component parts of the valve structure, by directing the fluid jets in such a way as to force them to impinge upon other similar fluid jets.

A still further object of this invention is to provide a valve cage trim assembly in which flow passageways of considerable complexity may be formed conveniently, inexpensively, and precisely, but which retains the structural durability of conventional cage trims.

In the present invention, these purposes, as well as others which will be apparent, are achieved generally by the provision of a valve trim having a central generally cylindrical inner cage in which is slidably received a valve plug element carried on an axially reciprocable valve stem. Outside of this cage and in circumferential engagement therewith is a second cage member, and outside this second cage member there may be other similar cage members, the inner surface of each succeeding cage member engaging the outer surface of the cage member inside it to prevent fluid flow in an axial direction between cage members. The walls of the inner and additional cages are provided with flow restricting orifices. A valve inlet passageway is provided through which fluid reaches the exterior of the outer cage, while a valve outlet passageway connects with the interior of the inner cage. When the valve plug is moved to an open or partially open position, fluid flows from the valve inlet through flow restricting orifices in the successive stages into the interior of the inner cage on the outlet side of the valve plug, thence to the valve outlet.

The fluid jets which are formed by passage of the fluid through the orifices in the innermost throttling stage are directed radially inward and consequently dissipate their energy upon each other rather than upon the internal parts of the valve as the fluid decelerates, thereby decreasing the likelihood of cavitation damage to valve parts and resulting in quieter valve operation.

A valve constructed according to this invention may, of course comprise as many orificial throttling stages as may be required considering the pressure differential desired to exist across the valve in operation. Flow regulation is achieved by axial adjustment of the valve plug to expose more or fewer of the orifices to the flowing fluid, this adjustment being accomplished by axial movement of the valve stem by any of the several well-known valve positioning means.

BRIEF DESCRIPTION OF THE DRAWINGS

Attention is now directed to the annexed drawings, wherein like numbers denote like or corresponding elements, and in which.

DESCRIPTION OF A PREFERRED EMBODIMENT

Figure 1:
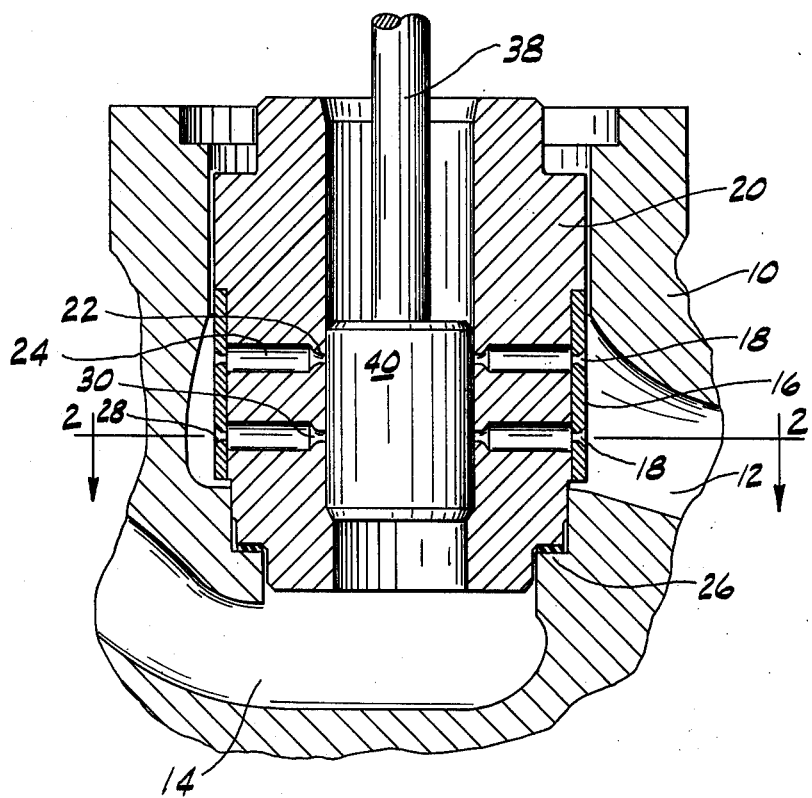
FIG. 1 is a vertical cross-sectional view of an embodiment of the present invention having two stages of orificial throttling, shown in a closed position, and mounted in a control valve body.

In the embodiment shown in FIG. 1, the valve trim of our invention is shown housed in a valve body, generally designated 10, having an inlet 12 and an outlet 14. The valve trim of this embodiment is constructed of a first outer annular cage element 16, having in its wall a set of flow restricting orifices 18. Within this first cage element 16 is a second inner cage element 20 having in its wall a second set of flow restricting orifices 22 aligned with a set of enlarged pressure recovery chambers 24 and also aligned with the first set of orifices 18 in the outer cage element 16.

The first cage element 16 and the second cage element 20 are dimensioned so as to be in circumferential engagement to prevent relative movement of the two elements and maintain alignment of the orifices 18 with the orifices 22, and to prevent fluid flow in the axial direction between the outer cage element 16 and the inner cage element 20. This circumferential engagement between the two elements 16 and 20 may be achieved, for example, by pressing or shrinking the two together during assembly.

Disposed within the interior of the cage member 20 and coaxial therewith is a valve stem 38, one end of which extends through an appropriate opening in the valve bonnet (not shown) and is axially reciprocable by any of the several well-known valve actuating means. Retained within an annular recess in the bonnet surrounding the stem 38 may be any suitable stem sealing assembly (not shown) which prevents the escape of fluid from within the valve into the surrounding atmosphere. One such suitable sealing assembly comprises the well-known seal material, packing follower, and packing nut arrangement.

Carried by the valve stem 38 is a cyclindrical valve plug member 40 which is radially dimensioned to slidingly engage the inner surface of the cage member 20, and by reciprocating action of the valve stem 38 the valve plug member 40 is reciprocable within the valve cage 20. Thus, when the valve is closed, the plug member 40 prevents the passage of fluid from the inlet 12 to the outlet 14 through the orifices in the walls of cage members 16 and 20. When the valve stem 38 is moved axially to a "valve open" position, the plug member 40 will be seen to be moved thereby to expose some or all of the orifices 18 and 22 on the side of the plug member 40 nearest the valve outlet 14, for fluid flow.

The wall of the inner cage element 20 is shown in FIG. 1 as being substantially thicker than the wall of the outer cage element 16. This relationship is desirable for two reasons: first, because it is desirable to use the inner cage member 20 as the load-bearing member sustaining the compressive load of the seal ring 26, and second, because in the construction of a valve trim according to our invention it is easier to form the pressure recovery chambers 24 in the outer surface of the cage member 20 than in the inner surface of the cage member 16.

It is an advantage of a valve trim constructed in accordance with our invention that a great deal more latitude is available in the selection of the relative dimensions and shapes of the orifices 18 and 22 and the pressure recovery chambers 24 than would be possible in a unitary prior art valve trim, for the reason that the pressure recovery chambers 24 are formed before assembly of the cage members 16 and 20. We have found it useful to take advantage of this feature to enhance the cavitation prevention characteristics of valves having this type of trim employed in liquid-throttling service by maintaining certain predetermined relationships between the diameters of the pressure recovery chambers 24 and the orifices 18, and likewise between the length of the recovery chambers 24 and the diameter of the orifices 18. Specifically, we have found it desirable to make the diameter of the pressure recovery chambers 24 at least three times the diameter of the orifices 18, and the length of the chambers 24 at least ten times the diameter of the orifices 18, in order to provide a volume sufficient for the destruction of liquid jets formed by the passage of a liquid through the orifices 18 during operation of this valve trim.

Figure 2:
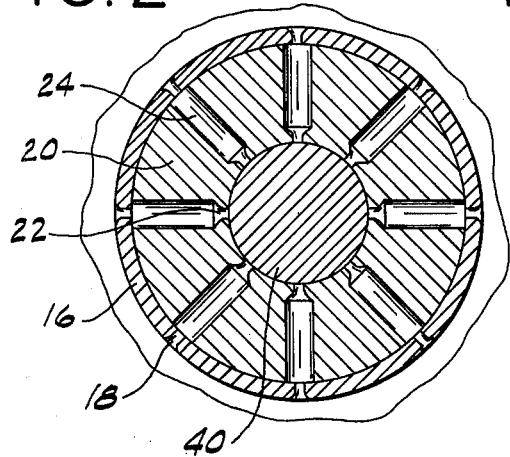
FIG. 2 is a horizontal cross-sectional view of the valve of FIG. 1 taken across section 2—2 of FIG. 1.
Figure 3:
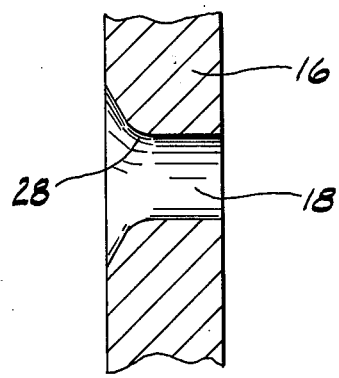
FIG. 3 is an enlarged cross-sectional view of an orifice in the valve of FIG. 1.

Moreover, it is a further advantage of a valve trim constructed in this fashion that the shape of the inlet portions 28 and 30 of orifices 18 and 22 may be easily controlled. We have discovered that when throttling liquids it is advantageous to provide radiused inlet portions 28 and 30 for these orifices, such as that shown more clearly in FIG. 2, because this orifice inlet shape will minimize turbulence, in the liquid being throttled, as it enters the orifices 18 and 22. We have found that in using a conventional sharp-edged orifice the fluid boundary layer tends to separate from the wall of the orifice and thereby produce a region of cavitating flow within the orifice bore. A radiused inlet portion in the orifices, however, will largely eliminate this boundary layer separation and prevent the cavitation. When the radius of the inlet portions 28 and 30 of the orifices 18 and 22 is from approximately 30 to 80 percent of the radius of the orifice, and preferably about one-half the diameter of the orifice, we have found that an increase of approximately 26 percent is realized in the capacity of liquid which may be throttled in a valve constructed according to this invention, compared to a valve using conventional sharp-edged orifices operating at the same pressure differential, without cavitation. Moreover, the use of radiused inlet portions to the orifices 18 and 22 results in improved resistance to erosion by particulate solids entrained in the fluid to be throttled in such a valve, compared to a conventional sharp-edged orifice, making this structure useful for throttling of gases as well as liquids.

It will be apparent that in the multistage throttling of a fluid in a valve trim constructed in accordance with this invention the final stage of orificial throttling occurs upon the passage of fluid through the orifices 22 into the central bore of the inner cage member 20. We have found that the direction of the fluid radially inward is particularly advantageous, because the fluid jets from diametrically opposed orifices are forced to expend energy upon each other rather than on the valve body or valve internal elements, as is the case in conventional valves, thus resulting in diminished cavitation, quieter valve operation, and decreased erosion of valve parts.

Figure 4:
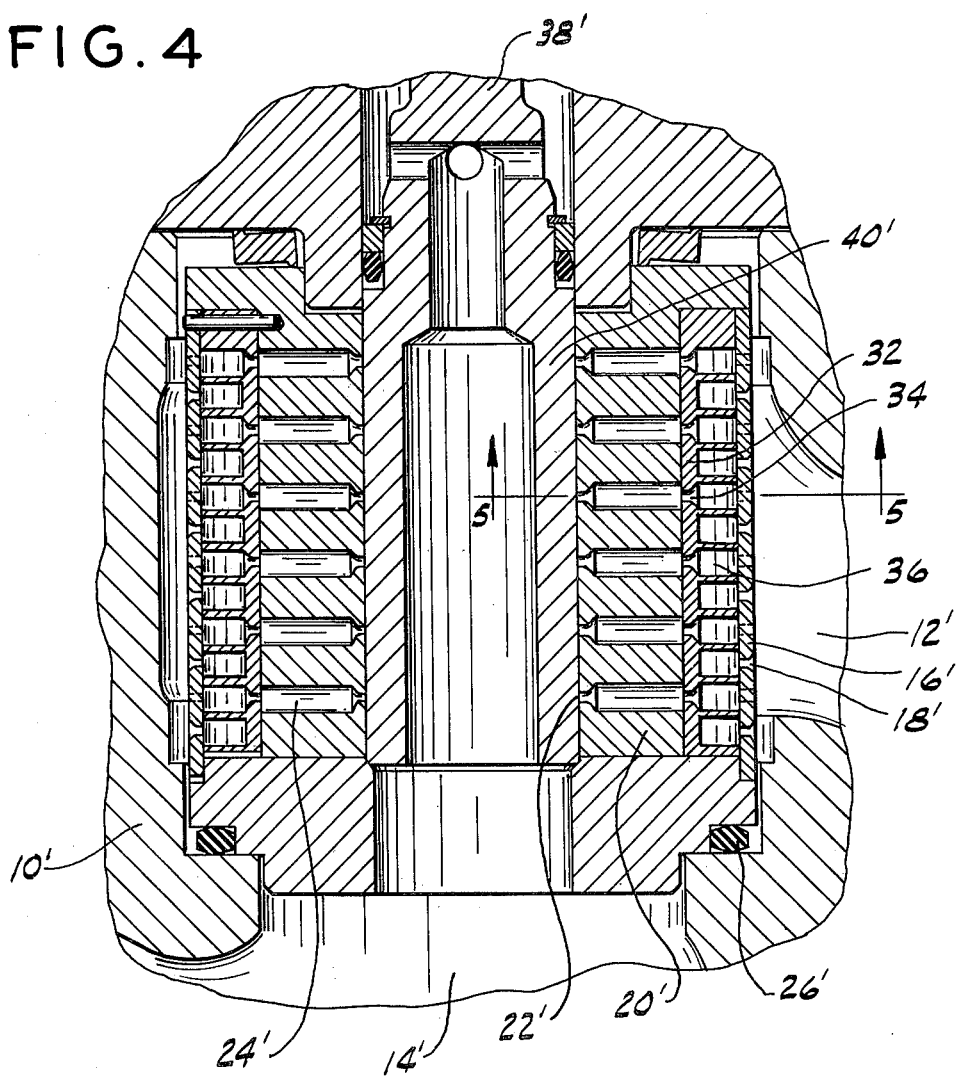
FIG. 4 is a vertical cross-sectional view of an embodiment of the present invention having three stages of orificial throttling, shown in a closed position.
Figure 5:
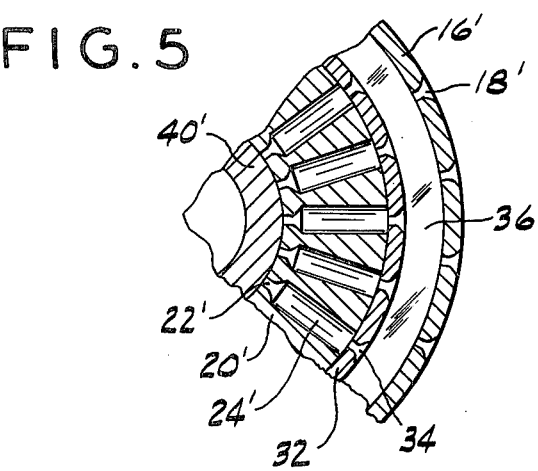
FIG. 5 is a horizontal cross-sectional view of the valve of FIG. 4, taken across section 5—5 of FIG. 4.

In FIGS. 4 and 5, there is shown a second embodiment of the present invention having three stages of orificial throttling. In this valve trim three concentric annular cage members are employed, each having in its wall a set of flow-restricting orifices. The first outer cage member 16' and the third inner cage member 20' are shown constructed similarly to the corresponding outer and inner members in FIG. 1. The intermediate second member 32 is shown having in its outer surface a series of circumferential grooves 36 aligned with the orifices 18' of the outer cage member 16', and having in its inner wall a set of orifices 34 aligned with the orifices 22' and pressure recovery chamber 24' of the inner cage member 20'. Although the intermediate cage member 32 could equally well be constructed having pressure recovery chambers such as those in the inner cage member 20', the use of the circumferential grooves 36 as a pressure recovery volume allows a thinner wall of the cage member 32 than would be possible if pressure recovery chambers were employed, with a consequent reduction in the space required for the valve trim assembly. The flow-restricting orifices in the cage members 16' and 32 are out of alignment circumferentially relative to one another as best shown in FIG. 5.

It will be apparent to those skilled in the art that a valve trim cage constructed of annular members as hereinbefore described exhibits many advantages over prior art trim cages. Such a structure may be constructed by simple and inexpensive fabrication techniques, such as casting or drilling followed by surface machining, and yet comparatively complex flow paths may be realized through such a cage after assembly.

Having thus described the preferred embodiments of this invention, it will be apparent that many modifications and variations are possible in the light of the above teachings. It is therefore to be understood that our invention may be practiced other than as herein specifically described.

I claim:
1. In a fluid control valve having an inlet and an outlet, a cavitation-resistant valve trim cage comprising:
   a first cage member having an annular wall and having a set of first flow-restricting orifices in said wall;
   an inner second cage member having an annular wall, said inner second cage member being received within said first cage member and having its outer surface in circumferential engagement with the inner surface of said wall of said first cage member, said wall of said inner second cage member having a set of second flow-restricting orifices and having enlarged flow passages communicating between said sets of first and second orifices;
   the centerline of each of said second flow-restricting orifices corresponding with the centerline of said enlarged flow passages;
   said first and inner second cage members being positioned such that the centerline of any orifice of said set of second flow-restricting orifices corresponds to the centerline of the aligned orifice of said set of first flow-restricting orifices;
   said first and second orifices each having radiused inlet portions having a radius of curvature between 30 and 80 percent of the diameter of said orifices;
   said second orifices each being diametrically opposed to another in said wall of said second cage member; and
   wherein flow through said cage members is from outside said first cage member to inside said second inner cage member,
   whereby the fluid jets through said diametrically opposed second orifices expend energy impinging upon one another rather than on the valve body or internal valve elements.

2. The valve trim cage of claim 1, wherein said enlarged flow passages are cylindrical pressure recovery chambers.

3. The valve trim cage of claim 2, wherein said pressure recovery chambers have a diameter at least three times, and a length at least ten times, the diameter of said first flow-restricting orifices.

4. The valve trim cage of claim 1 wherein the wall of the inner second cage member is substantially thicker than the wall of the first cage member.

5. The valve trim cage of claim 1 wherein the first cage member has in its outer surface a series of circumferential grooves, and
   an outer third cage member having an annular wall engaging the first cage member so as to form annular pressure recovery chambers between the first cage member and the outer third cage member,
   the outer third cage member having a set of third flow-restricting orifices having radiused inlet portions having a radius of curvature between 30 and 80 percent of the diameter of said orifices.

6. The valve trim cage of claim 5 wherein the third flow-restricting orifices are out of alignment relative to the flow-restricting orifices in said first cage member.

* * * * *